M. COOK.
HOLDDOWN FOR LASTING MACHINES.
APPLICATION FILED JULY 22, 1913.
1,092,431.
Patented Apr. 7, 1914.
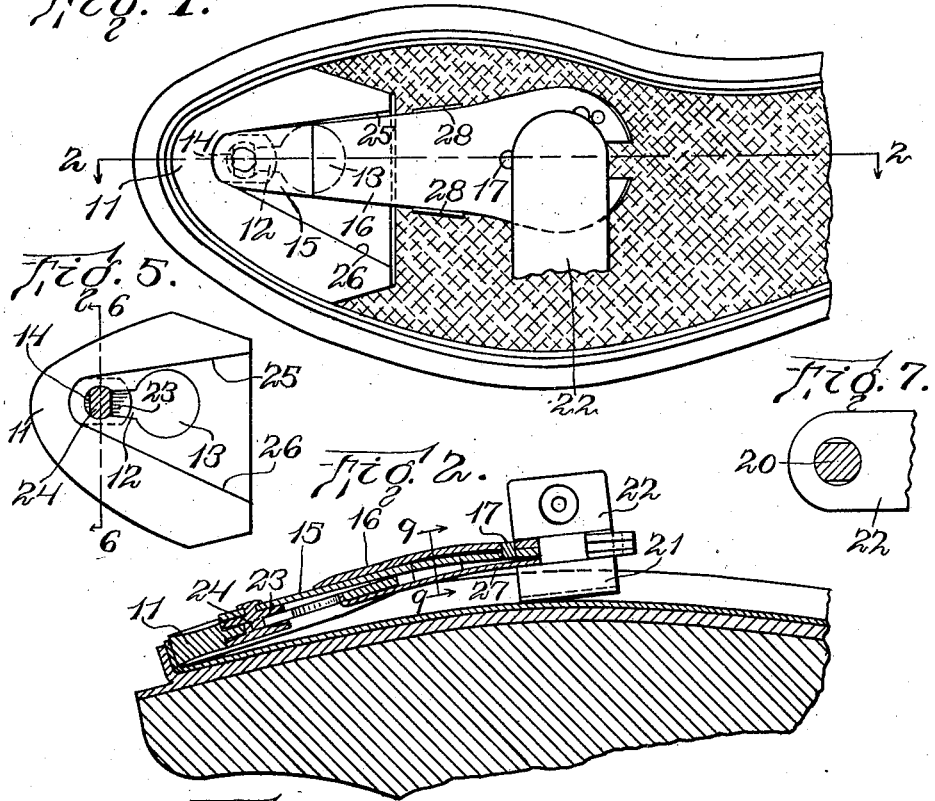
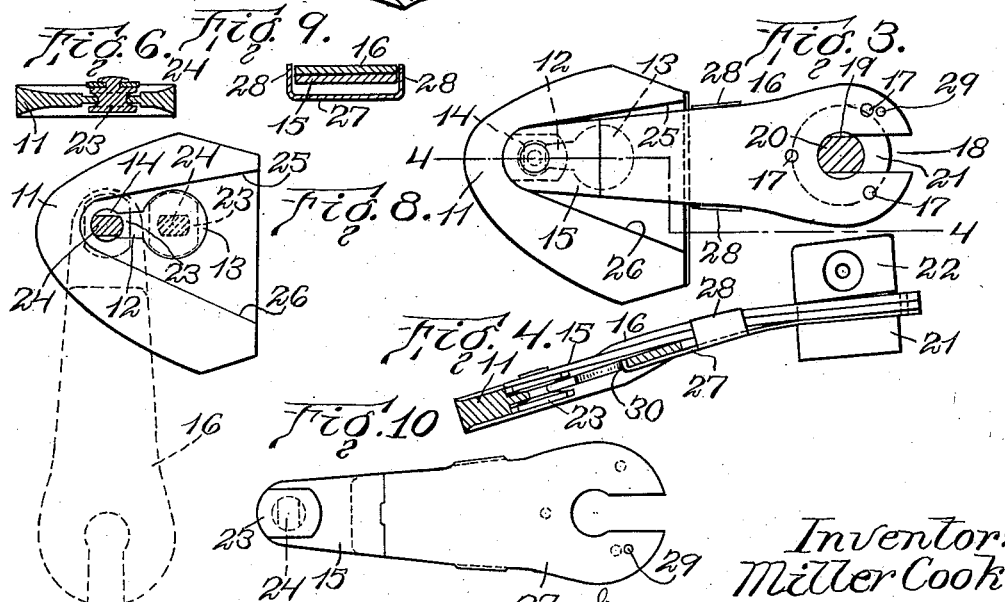
Witnesses:
D. L. Clark
E. Batchelder
Inventor:
Miller Cook

UNITED STATES PATENT OFFICE.

MILLER COOK, OF WHITMAN, MASSACHUSETTS.

HOLDDOWN FOR LASTING-MACHINES.

1,092,431.  Specification of Letters Patent.  Patented Apr. 7, 1914.

Application filed July 22, 1913. Serial No. 780,526.

*To all whom it may concern:*

Be it known that I, MILLER COOK, a citizen of the United States, and resident of Whitman, in the county of Plymouth and State of Massachusetts, have invented certain new and useful Improvements in Hold-downs for Lasting-Machines, of which the following is a specification.

The present invention relates in its general nature to the same subject as my prior patent entitled Hold-downs for lasting machines No. 1,047,387 dated December 17, 1912, and has the same general objects as the device described and claimed in said patent.

Specifically the present invention consists in certain improvements in construction and mode of assembling the parts of the hold-down provided to make the disconnectible connection between the hold-down plate and its supporting arm perfectly secure and with little or no backlash, without increasing the difficulty of disconnecting and reconnecting the hold-down plate when changes are required.

I have illustrated the preferred embodiment of the improvements in which my invention consists, in the accompanying drawings in which—

Figure 1 is a plan view of my improved hold-down device in the operative position which it occupies in bearing upon an inner sole placed on a last. Fig. 2 is a section on line 2—2 of Fig. 1. Fig. 3 is a plan view of the hold-down removed from the shoe. Fig. 4 represents a longitudinal sectional elevation on line 4—4 of Fig. 3. Fig. 5 is a plan view of the hold-down plate showing the manner in which the same is connected with its carrying arm. Fig. 6 is a cross section of the same on line 6—6 of Fig. 5. Fig. 7 is a plan view of an end of the machine arm to which the hold-down device is connected. Fig. 8 is a plan view illustrating in dotted lines the manner in which the hold-down plate is connected with and disconnected from its supporting arm. Fig. 9 is a detail sectional view on line 9—9 of Fig. 2. Fig. 10 is an under plan view of the arm of the hold-down device and its associated spring.

The same reference characters indicate the same parts in all the figures.

In the drawings 11 represents the hold-down plate proper, which is constructed substantially as described and illustrated in my prior patent above specified and has a key-hole shaped slot 12 consisting of a narrow part with an enlargement 13 and a smaller enlargement 14, the latter being approximately circular and the former being of any desired shape, provided it conforms to the shape of the connecting stud hereinafter described. The supporting arm for the hold-down plate is shown at 15 and is provided with a reinforcing strip or plate 16 which is connected rigidly with the arm 15 at a point remote from the hold-down plate, and extends over the arm to stiffen and hold yieldingly the resilient arm 15. The arm and the reinforcing strip or tongue are secured together by any suitable means such as rivets 17 or otherwise. The arm 15 in its end remote from the hold-down plate has an open end and slot 18 formed at its inner end with a circular enlargement 19, such slot being adapted to receive the stem 20 of a stud 21 which is fixed in an arm 22. Said arm 22 is a part of the lasting machine to which the hold-down attachment is connected. The head 21 of stud 20 is at a distance from the arm 22 sufficient to admit the end of the arm 15, reinforce 16 and a spring which I will presently describe, and is near enough to the arm 22 so that such spring may retain the hold-down arm frictionally. The diameter of the stud 20 is somewhat larger than the width of the slot 18 and is about equal to the diameter of the enlargement 19, while the sides of the stud are cut away to a width slightly less than that of the slot 18, the aim being to enable the hold-down arm to be attached to the machine arm 22, that is, when the slot is in line with the flattened sides of the stud, and to be locked when the stud is in the enlargement 19 and the hold-down arm is turned. The connection between the arm 15 and the hold-down plate 11 is made by a stud 23 having a shank 24 which is smaller than its head, and the sides of which are cut away as shown in full lines in Figs. 5 and 8 and in dotted lines in Figs. 3 and 10. The head of stud 23 is adapted to pass through the enlargement 13 of the slot 12 in the hold-down plate, and the shank to reside in the smaller enlargement 14 of that slot. The longer diameter of stud 24 is approximately equal to the diameter of enlargement 14 and greater than the width of the narrow neck of the slot, while the smaller width of the stud, between the flattened sides thereof is less than the width of the slot 12. The stud is fixed in the arm 15 with its longer diameter transverse to the length of the arm also to the longitudinal medium line of the hold-down plate. Thus when the arm is connected with the hold-down plate in the normal position, which is that illustrated in Figs. 1, 2, 3, 4, and 5, the stud is held in the enlargement 14 with its flattened sides approximately perpendicular to the narrow part of the slot, the hold-down plate being then locked so that it can not move in any direction except oscillatably through a slight angle about the stud 24. The amount of oscillation is limited by the walls 25 and 26 of a shallow recess in the hold-down plate in which the arm 15 lies.

A spring 27 in the form of a resilient plate or strip having the outline of the arm 15 and having a slot in the end which corresponds to the slotted end of said arm, is placed under this arm and is held in proper position by lugs 28 on its sides which embrace the arm 15, and by stud 29 on the latter which enters a hole in the spring. The spring extends under the rear end of the hold-down plate and has a tongue 30 which projects up into the enlargement 13 of the slot in said plate, very near to the rear boundary of such enlargement. The pin 29 on the spring 27 enters a complemental recess in the arm 15 when the slots in the spring and arm are in registry, thereby enabling the spring and arm to be together passed over the stud 20. As the spring diverges from the arm between the slotted end of the latter and the hold-down plate, it is pressed upon and forced toward the arm when inserted between the machine arm 22 and the stud head 21, the space between which is less than the distance between the spring and the outer side of the arm when the spring is unconfined. Thereby the spring is put under stress and caused to perform the double function of exerting a friction on the machine arm 22 which resists swinging thereof, and to hold the toe plate at the rear end so that the same can neither become instantly disconnected from the arm 15 nor hang loosely from the stud 24.

In other respects the hold-down device is substantially like that illustrated in my patent above referred to, the hold-down plate being detachable and reversible, so that the same plate may be used in connection with right and left shoes of the same sizes and styles, and so that other plates for other styles and sizes of shoes may be substituted. In order to make such change of substitution of the hold-down plate, the hold-down arm must be removed from the machine arm 22, which can be done by a simple movement when the hold-down arm is in the position shown in Fig. 3. The spring 27 can then be readily removed as it is unconfined, and this releases the hold-down plate so that it or the arm 15 may be turned as shown by dotted lines in Fig. 8 to enable the stud shank 24 to be slipped through the slot 12 into the enlargement 13 and the stud to be removed. When the hold-down plate and arm are assembled, the wider dimension of the stud shank extends across the slot 13, and the spring 27 prevents the hold-down plate in turning far enough to permit disengagement. In this manner of fastening, the tongue 30, lugs 28, and stud 29 form positive locking means which absolutely and positively prevent accidental separation of the hold-down plate from its arm. In the device shown in my prior patent the hold-down plate is secured yieldingly by a spring, and may be accidentally displaced.

The tongue or lip 30 on the spring plate 27 enters the enlargement 13 of the slot or recess in the hold-down plate and bears against the shoulder formed by the rear edge of such recess. This tongue is an additional means for preventing movement of the hold-down plate longitudinally of the arm. That is, even without the shoulders formed at each side of the merger of the slot 12 with the enlargement 14, the tongue or lip 30 would still be effective to prevent movement of the plate away from the end of the arm 15. The stud 24 and this tongue together constitute positive means for preventing movemnt of the plate in any direction relatively to the arm when the plate is in its normal position and the spring arm 27 is assembled with the arm 15.

What I claim and desire to secure by Letters Patent is:—

1. The combination of an arm, a stud mounted on said arm having a head displaced from the adjacent surface of said arm and having a shank of which the opposite sides are flattened, and a hold-down device comprising an arm, a spring, and a hold-down plate contained between said spring and said last-named arm, said last-named arm and spring each having an open slot in its end of a width adapting it to be slipped over the flattened sides of the aforesaid stud, and less than the longest diameter of said stud, and having also an enlargement merging with said slot of a diameter sufficient to contain the longest diameter of said stud.

2. In a hold-down device for lasting machines the combination of a hold-down plate, an arm, a coupling device between said arm and plate formed to prevent disengagement of the arm from the plate except upon relative rotation through approximately a right angle, and a spring arranged to take up looseness between the plate and arm and having positive means for preventing such relative rotation.

3. A hold-down device for lasting machines comprising in combination an arm, a hold-down plate having a slot provided with an enlargement, a coupling stud on said arm having a head adapted to enter said enlargement and a shank of less size adapted to pass from the enlargement through said slot, a lock for preventing relative movement between said arm and plate, and a main support having means for detachable engagement with said arm and having means for securing said lock.

4. In a hold-down device for lasting machines the combination with a part of the machine forming a support, a stud mounted in said support having a head extending over a surface of said support and separated therefrom, an arm detachably engaged with said stud at one end, a coupling member secured to said arm near its other end, a hold-down plate swivelly mounted upon said stud constructed to be locked with or released from said stud by turning thereon, and a spring having one end confined between said support and its stud and its other end bearing on the hold-down plate, said spring being placed under tension by said support and caused to press the hold-down plate toward the arm, and having a positive locking means to limit pivotal movement of the hold-down plate.

5. In a hold-down device for lasting machines the combination of an arm, a stud projecting from one face of said arm and having a head and a shank, a hold-down plate having a recess in which said shank is contained and having a slot communicating with said recess of a width less than that of the recess and intermediate the longer and shorter diameters of the stud, said plate being separable from said arm only by a combination of rotative and translative movements, positive means for restraining the rotative movement within limits less than sufficient to permit separating translative movement of the plate, and a support to which said arm is detachably connected said support being constructed and arranged to hold said locking means in locking position.

6. The combination of an arm, a hold-down plate having a shoulder, a coupling device between said arm and plate, and a complemental arm bearing on the side of the plate opposite to the first arm and having a tongue or lip engaged with the shoulder of the plate.

7. The combination of an arm, a hold-down plate having a shoulder, a coupling device between said arm and plate, and a complemental arm bearing on the side of the plate opposite to the first arm and having a tongue or lip engaged with the shoulder of the plate and so disposed as to positively oppose movement of the plate in one direction longitudinally of the first arm.

8. A hold-down device comprising an arm, a hold-down plate, a coupling stud on said arm, said plate having a slot in which said coupling stud is contained, a portion of such slot being of less width than the head of said stud, and another portion of such slot being of greater area than the head of the stud, and the stud being normally contained in the portion of said slot which has the less width, a spring arm arranged on the opposite side of said plate from the first named arm and having a means for limiting the movement of the plate with respect to the first named arm to an amount less than sufficient to permit disconnection of the plate from the coupling stud, and means for retaining said spring arm in operative position.

9. A hold-down device for lasting machines comprising in combination, a main supporting arm, a stud projecting from said arm and having a head, a second arm having a slot at one end adapted to be placed upon said stud between the head thereof and the main arm, a coupling stud carried by the second named arm, a hold-down plate having a slot adapted to receive the shank of said coupling stud and formed to permit disengagement of the plate from said coupling stud in consequence of movement relatively to the stud, and a spring arm arranged in parallel with the second named arm and having one end underlying said hold-down plate and its other end confined between the second named arm and the head of the first named stud, said spring arm having a locking device engaging the hold-down plate and arranged to prevent said plate from being moved sufficiently to become disengaged from the coupling stud, and said spring arm also serving to take up looseness between the second named arm and the first named arm.

In testimony whereof I have affixed my signature, in presence of two witnesses.

MILLER COOK.

Witnesses:
E. BATCHELDER,
J. MURPHY.